Figure 1:
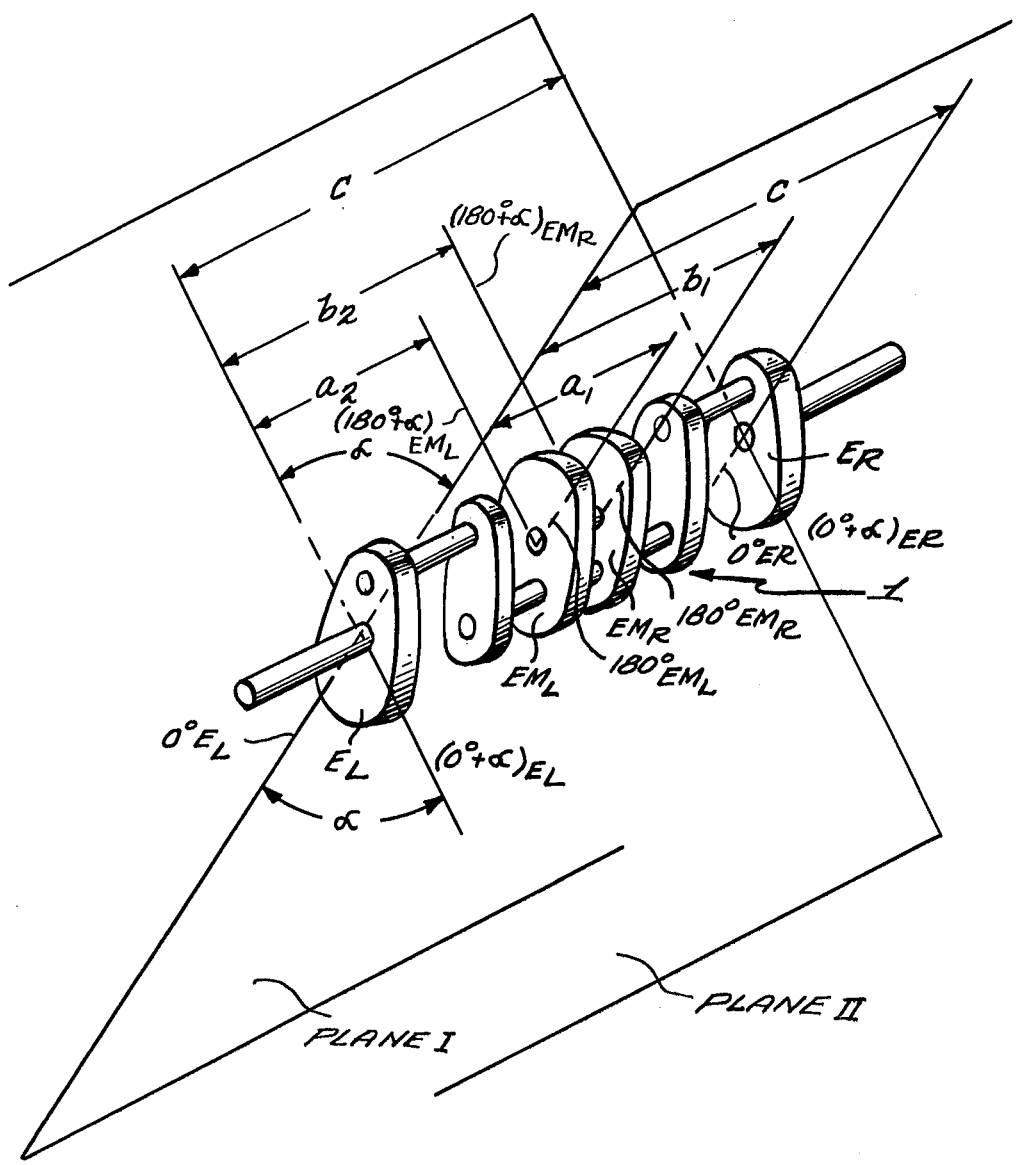

United States Patent [19]

Brunnengräber

[11] 4,104,919

[45] Aug. 8, 1978

[54] BALANCING MACHINE CIRCUIT FOR ELIMINATING UNBALANCES

[75] Inventor: Hermann Brunnengräber, Heppenheim, Fed. Rep. of Germany

[73] Assignee: Gebr. Hofmann KG, Maschinenfabrik, Darmstadt, Fed. Rep. of Germany

[21] Appl. No.: 705,831

[22] Filed: Jul. 16, 1976

[30] Foreign Application Priority Data

Jul. 21, 1975 [DE] Fed. Rep. of Germany ....... 2532597

[51] Int. Cl.$^2$ .................... G01M 1/30; G01M 1/38
[52] U.S. Cl. .......................................... 73/462; 408/13
[58] Field of Search ................. 408/12, 13, 76, 70; 73/46

[56] References Cited

U.S. PATENT DOCUMENTS

| | | | |
|---|---|---|---|
| 2,779,217 | 1/1957 | Stouall et al. | 408/12 |
| 2,804,775 | 9/1957 | Hack | 82/DIG. 8 |
| 2,872,819 | 2/1959 | King | 73/462 |
| 2,919,581 | 1/1960 | Lash | 73/462 |
| 2,932,191 | 4/1960 | Jahn | 73/462 |
| 2,947,172 | 8/1960 | King | 73/462 |
| 3,091,125 | 5/1963 | Budnick | 73/462 |

FOREIGN PATENT DOCUMENTS 979,013 1/1965 United Kingdom ........... 73/462

*Primary Examiner*—Othell M. Simpson
*Attorney, Agent, or Firm*—Cushman, Darby & Cushman

[57] ABSTRACT

A circuit and process for eliminating unbalances on a rotor which permits equalization of unbalance only in constructionally predetermined equalization planes and component angles in which conventionally produced balance signals indicating the amounts and angles of unbalance are rectified and applied to an arithmetic circuit which produces output signals indicating the amounts of unbalance in equalization planes and, where balance in a given equalization plane is not possible, the amount of unbalance in a substitute plane. To permit balancing of different type workpieces having different dimensions, potentiometers are connected to the arithmetic circuit and to a longitudinal positioning circuit for applying signals indicating locations of the planes.

5 Claims, 2 Drawing Figures

BALANCING MACHINE CIRCUIT FOR ELIMINATING UNBALANCES

The invention relates to a process and apparatus for the elimination of unbalances on rotors which permit compensation for unbalance only in constructionally predetermined compensation planes and limited angular components. In such process and apparatus electric unbalance signals proportional to the angular position and magnitude of the unbalance values are converted to the constructionally predetermined compensation planes and angular components, and the converted signals control compensation for unbalance in the constructionally predetermined compensation planes and angular components.

Some rotors e.g., crankshafts, can be compensated for unbalance only within limited angular areas, so that compensation of the unbalance must normally be made in several compensation planes, the angular areas of which supplement each other. Several techniques are known for accomplishing this function and some, at least partially, involve automation of the balancing machine.

For example German Pat. No. 1,167,559 shows an arrangement on a balancing machine which makes possible the balancing of rotors which can be compensated for unbalance in constructionally provided compensation planes and within limited angular areas. According to this patent, the unbalance values are converted into DC voltages and fed to the pertinent equivalent (substitute) planes by way of switching means dependent on the direction of the current. The switching means are connected between the converters and recording means and include control devices for preventing attempted equalization, whenever the DC voltages assigned to the outside equalization planes have a negative sign, which indicates that an equalization cannot be carried out in these planes.

This known arrangement was designed only for one type of balancing body and it is not possible to easily carry out a conversion for the substitute planes and the equalization planes e.g. for rotors in which the median plane is disposed eccentrically. Further for rotors which are to be balanced successively with different dimensions between the substitute median planes and the equalization planes, difficulties will result since the known arrangement cannot simply be adjusted for other balancing body types with other dimensions. Thus shifting of the plane because of a different construction of the crankshaft is difficult and expensive.

These difficulties occur especially in the case of automatic balancing machines since the balancing unit is adjusted for one balancing body type and cannot simply be changed over to other balancing body dimensions. For known automatic balancing machines, to change the type of balancing body, a correspondingly separate adjustment of the electric frame and a change over of the balancing units is required. This requires considerable time and the danger exists that, as a result of the difficult coordination, mistakes will occur and inaccuracies result.

Therefore, the object of the present invention is a process for the elimination of unbalances on rotors which permits an equalization of the unbalance only in constructionally predetermined equalization planes and limited angular components as well as a circuit for a balancing machine to carry out this process, and to avoid the previously described disadvantages by making possible adjustment of the balancing machine in quick succession for variable types of balancing bodies, especially for different types of balancing bodies with variable equalization plane distances.

This object is accomplished in that adjustable electric voltages corresponding to the distances of the balancing planes, which are used for the conversion of the unbalance signals to the constructionally predetermined equalization planes, are used simultaneously for the positioning of the balancing tools with respect to the rotor that is to be balanced in the direction of the successive constructionally predetermined equalization planes and that variable electric signals proportional to the component angles are used in the pertinent equalization plane both for conversion of the unbalance signals to the constructionally predetermined component angles and for the angular positioning of the balancing arrangement in relation to the rotor that is to be balanced.

To carry out this function, a circuit is used for balancing machines for the elimination of unbalances on rotors which permit the equalization of unbalances only in constructionally predetermined equalization planes and angular components which includes an electric frame and an electric arithmetic unit, which converts the unbalance values for the constructionally predetermined equalization planes and component angles and in the case of the existence of unbalance values, which cannot be equalized in an equalization plane, convert these values to substitute median planes and/or the other equalization planes. Further according to this invention, voltages corresponding to the equalization plane distances are simultaneously applied to a longitudinal positioning circuit, which shifts either the balancing arrangement or the rotor that is to be balanced perpendicularly in relation to the successive equalization planes, as well as to the arithmetic unit which converts the unbalance values for the substitute median planes and/or other equalization planes. Both an angular positioning arrangement which turns the rotor or the balancing arrangement into the corresponding component angle, as well as phase-dependent rectifiers connected to the arithmetic unit, are acted upon by the voltage proportional to the component angles.

In order to be able to carry out the individual steps of equalization one after the other, a program control circuit can be provided which connects the outputs of the arithmetic unit, which converts the non-balanceable unbalance values for the substitute median planes and/or the other equalization planes, successively with the balancing arrangement and which simultaneously applies the corresponding voltages, proportional to the equalization plane distances to the longitudinal positioning circuit and applies the corresponding signals provided for the conversion of the component to the angular positioning circuit.

For the determination of the unbalance values, which are converted for the substitute median planes and the other equalization planes, electric unbalance signals can be applied corresponding also to the magnitude and position of the unbalance to the phase-dependent rectifiers.

The electric arithmetic unit can be developed advantageously in such a way as had been proposed in the older German patent application No. P 25 19 356.0. One advantage of this invention is that different types of rotors, especially rotors with different distances of equalization planes, can be balanced in any order without great expediture of time or money. This is true particularly for variable types of crankshafts. The balancing machine can be adapted to the corresponding geometric of the rotor that it is to be balanced both in the case of the determination of the unbalance as well as in the case of the successive equalization process through corresponding adjustment of the electric voltage used in the case of the conversion of the unbalance signals to the constructionally predetermined equalization planes. Then, after determination of the unbalance, the equalization process of the unbalance can be carried out automatically. Furthermore, at the most only slight errors of adjustment will occur which, under all circumstances, cannot be eliminated completely, but which are automatically compensated since the conversion of the unbalance value and the successive positioning takes place on the basis of equal values. In the case of the separate adjustments, which have been known hitherto, it was possible that the calculators would convert the unbalance values for angular components on the basis of already existing slight mistakes in adjustment on which in the end the full equalization did not take place, so that the residual unbalance remained in the balancing body.

Figure 2:
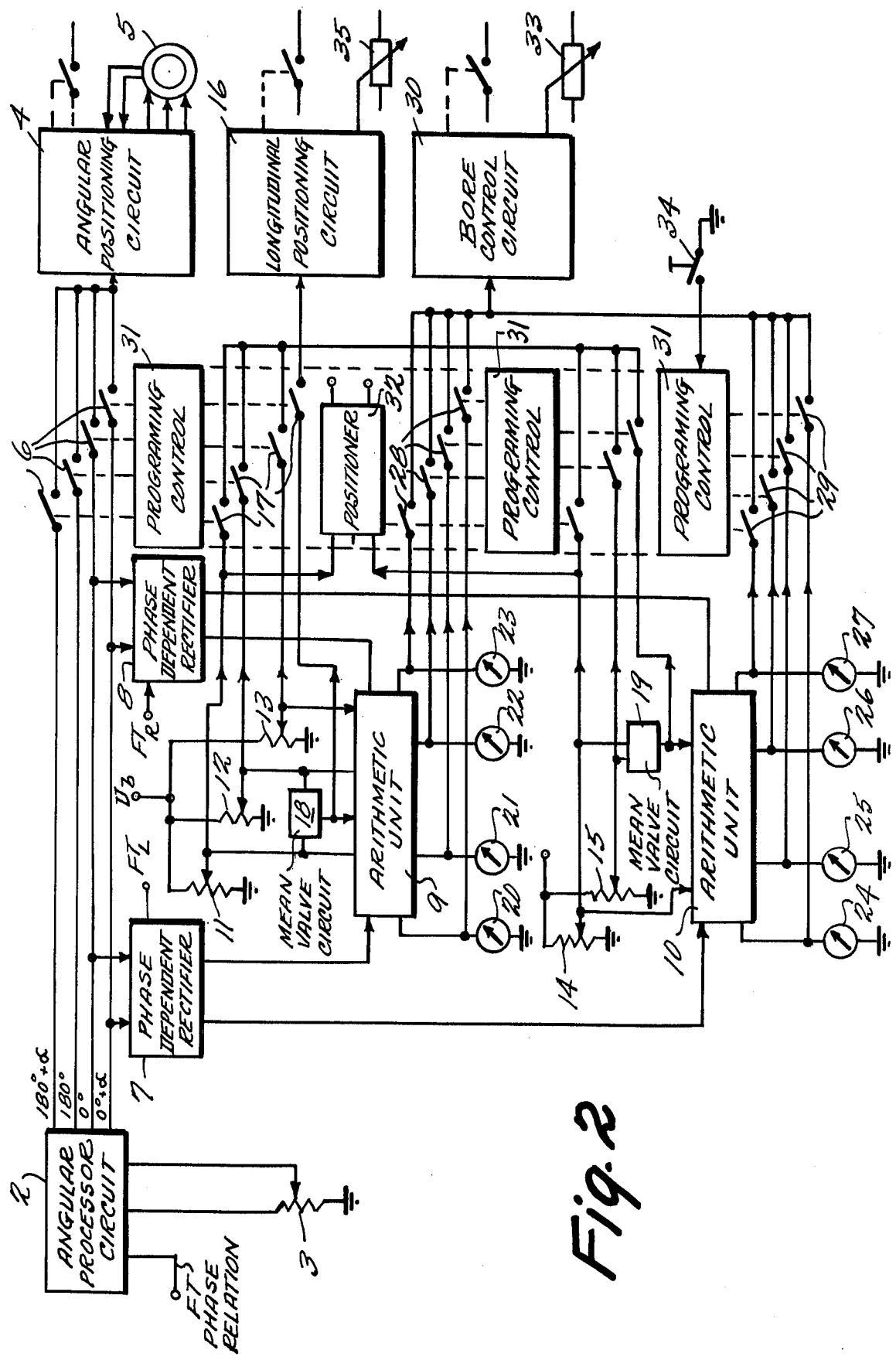

A preferred embodiment of the invention is shown in the attached figures in which:

FIG. 1 shows a four-cylinder crankshaft with the constructionally predetermined equalization planes and the component angles in which the equalization is to be carried out, and FIG. 2 shows a circuit arrangement for the determination of the equalization points.

FIG. 1 shows a four-cylinder crankshaft 1 with two outside equalization planes $E_L$ and $E_R$ and two additive median planes $EM_L$ and $EM_R$ in which, on the basis of the constructional data, an equalization of unbalance is possible only within limited angular areas. In a preferred manner, the two median planes $EM_L$ and $EM_R$, in the case of an equalization of unbalance of four-cylinder crankshafts, can be combined into one median equalization plane.

In the case of four-cylinder crankshafts, the equalization of unbalance takes place preferably in components adapted to the crankshaft in constructionally predetermined angular positions. For the sake of clear illustration, the plane in which one of the components lies is designated as longitudinal plane I and the plane in which the components lie rotated by angle $\alpha$, is designated as longitudinal plane II. The distance from the outside plane $E_L$ in the longitudinal plane I to the median plane $EM_L$ is designated by $a_1$ and the distance to the mediam plane $EM_R$ is designated $b_1$. The distance between the two outside planes $E_L$ and $E_R$ is labeled $c$ in both longitudinal planes I and II. The distances between the planes in the longitudinal plane II are designated by $a_2$, $b_2$ and $c$.

Although in the case of the four-cylinder crankshaft the distance $a_1$ and $a_2$ as well as $b_1$ and $b_2$ are the same, different designations are selected in order to point up the possibility of adjustment for different rotational bodies. The arrangement according to the invention can be adjusted e.g. very simply for a six cylinder crankshaft in the case of which, as is well known, the distances $a_1$ and $a_2$ as well as $b_1$ and $b_2$ are no longer the same.

An AC voltage, proportional to the unbalance and delivered by a conventional vibration pick-up, (not shown) and disposed in mounting frames of the balancing machine, is converted in an electric circuit for the outside equalization planes $E_L$ and $E_R$ and processed, e.g., according to the German Pat. No. 1,108,475, in order to obtain a signal FT in FIG. 2 indicating the unbalance according to unbalance value and phase position.

A phase relay, synchronous with this FT signal, which contains the unbalance of the four cylinder crankshaft 1 according to value and phase position, subsequently called FT phase relation, is fed to a conventional angular processor 2. The angle $\alpha$, depending on the balancing body, can be adjusted at the potentiometer 3 for the distribution of the components.

In angular processor 2 signals related to the conventional quadrants are produced in a known manner, the phase of which related to the FT phase relation represents the angles of the individual components. In the case of a four cylinder crankshaft 1, four quadrant signals are produced at 0°, 0° + $\alpha$, 180° and 180° + $\alpha$. The four outputs of the angular processor 2 are connected with a conventional angular positioning circuit 4 via switches 6. Processor 2 is also connected to a conventional generator 5 which indicates the angular position of the workpiece (not shown in detail).

Two of the outputs of angular processor circuit 2, in the illustrated embodiment given by way of example of 0° and 0° + $\alpha$, are adduced for the purpose of rectification of the FT signals which contain the unbalance with respect to value and phase position in phase-dependent rectifiers 7 and 8. The FT signal, proportional to the value and phase position of the unbalance in the two outside equalization planes is fed as an unbalance signal to the phase-dependent rectifiers 7 and 8. The FT signals are conventionally chopped in the rectifiers 7 and 8 once with a rectangle at 0° and a rectangle which is shifted by 0° + $\alpha$ and are rectified in such a way, that two components will develop, the opening angles $\alpha$ of which are determined by the chopping rectangles. The components can be positive or negative.

The outputs of rectifiers 7 and 8 are fed to arithmetic units 9 and 10, which are assigned to a longitudinal plane I or II in which the component angles lie. The arithmetic units 9 and 10 convert the unbalance values, which cannot be equalized in the outside planes $E_L$ and $E_R$, e.g. in accordance with the older German patent application No. 25 19 356, into the corresponding median planes $EM_L$ respectively $EM_R$ and/or the other outside equalization plane.

At the output of the arithmetic unit 9, equalization values for the equalization points develop from the component angles 0° + $\alpha$ of the plane $E_L$, 180° + $\alpha$ of the plane $EM_L$, 180° + $\alpha$ of the plane $EM_R$ and 0° + $\alpha$ of the plane $E_R$, and at the outlet of the arithmetic unit 10, the equalization values of the equalization points develop on the component angles 0° of the plane $E_L$, 180° of the plane $EM_L$, 180° of the plane $EM_R$ as well as 0° of the plane $E_R$, which can be displayed and/or recorded on the recording devices 20 – 27.

Arithmetic units 9 and 10 are adjusted by means of potentiometers 11–15 to the dimensions $a_1$, $b_1$, $c$, $a_2$ and $b_2$ of the crankshaft 1. That means, that it is possible to easily adjust for a six cylinder crankshaft. The same voltage values adjusted by the potentiometers 11–15 are fed to a longitudinal positioning circuit 16 in the equalization unit with the help of a positioner 32 via switch 17.

If required according to balance engineering, the median planes $EM_L$ and $EM_R$ can be combined into one median plane EM, so that in the electric circuits 18 and 19, the mean values $(a_1 + b_1/2) = d_1$, respectively $(a_2 + b_2/2) = d_2$ are formed, which then are fed also automatically to the longitudinal positioning circuit 16. The outputs of arithmetic units 9 and 10 can be fed furthermore by way of switches 28 and 20, e.g. to a depth of bore control 30 with a depth of bore transmitter 33, which then takes over the feed control of the equalization unit when drills are used for equalization. Programming control 31 ensures that the fixed measuring values are individually connected in succession with the depth of bore control 30 so a single fixed equalization tool, especially a single drill, can be used.

At the same time, the program control 31 ensures that the proper rectangular pulses of the angular processor 2 are applied by way of the switch 6 to the angular positioning circuit 4. In addition and at the same time the voltage values adjusted by the potentiometers 11–15, respectively the electric circuits 18 and 19, are applied in the proper manner to the longitudinal positioning circuit 16 with the help of the program control circuit 31 via the switches 17 and 36.

The program control 31 determines the sequence according to three criteria, namely:
1. the longitudinal positioning, e.g. from left to right;
2. the angular positioning, e.g. clockwise and
3. whether $a_1 > a_2$ or $a_1 < a_2$. The positioner 32 determines whether $a_1$ or $a_2$ is larger.

In the program control 31, furthermore a threshold can be provided and checked to decide whether or not all equalization and especiallly drilling points must be started or whether, in the case of the existence of a drilling value lying below the threshold, a drilling point can be passed over. The program control 31 is switched on correspondingly by means of a machine timing switch 34, so that after every equalization process, the next equalization point is considered with the three criteria — longitudinal position, angular position and balancing value.

What is claimed:

1. A circuit for a balancing machine for eliminating unbalances and a rotor which permits equalization of unbalance only in constructionally predetermined equalization planes and component angles comprising:
adjustable means for producing electrical signals indicating the distance between said equalization planes,
means for producing a signal to cause equalizing of unbalances in said rotor,
longitudinal positioning means for shifting the relative positions of said rotor and equalizing means successively in accordance with said electrical signals,
control means connecting said positioning means to said adjustable means for controlling application of said electrical signals to said positioning means,
means for generating a balance signal indicating position and angle of unbalance,
phase dependent rectifier means connected to said generating means for rectifying said balance signal and indicating non-balanceable values in equalization planes,
arithmetic circuit means connected to said rectifier means, said adjustable means, and said equalizing means for producing balance value output signals in said equalization planes and in substitute planes where balancing cannot take place in an equalization plane, and
control means connecting said arithmetic circuit means to said equalizing means for controlling said means for producing signal to cause equalizing in accordance with the output of said arithmetic circuit means.

2. A circuit as in claim 1 further including recording means connected to said arithmetic circuit means for recording said balance value signals.

3. A circuit as in claim 1 wherein said equalizing means includes means for producing a signal for drilling a bore.

4. A circuit as in claim 1 wherein said control means includes a plurality of switches and means for controlling said switches.

5. A circuit as in claim 1 wherein said adjustable means includes a plurality of potentiometers.

* * * * *